United States Patent [19]
Glogan

[11] Patent Number: 5,541,688
[45] Date of Patent: Jul. 30, 1996

[54] METHOD OF ASSEMBLING FLASH UNIT TO CAMERA

[75] Inventor: David J. Glogan, Rochester, N.Y.

[73] Assignee: Eastman Kodak Company, Rochester, N.Y.

[21] Appl. No.: 419,330

[22] Filed: Apr. 10, 1995

[51] Int. Cl.⁶ .................................................. G03B 15/03
[52] U.S. Cl. ..................................... 354/149.11; 354/288
[58] Field of Search .............................. 354/145.1, 149.1, 354/149.11, 288

[56] References Cited

U.S. PATENT DOCUMENTS

| | | | |
|---|---|---|---|
| 5,028,943 | 7/1991 | Ishii et al. | 354/145.1 |
| 5,305,037 | 4/1994 | Noguchi et al. | 354/149.1 |
| 5,371,563 | 12/1994 | Dassero et al. | 354/145.1 |

*Primary Examiner*—A. A. Mathews
*Attorney, Agent, or Firm*—Roger A. Fields

[57] ABSTRACT

A method of assembling a flash unit to a camera, comprises the steps of pivotally connecting the flash unit to a main body part of the camera, positioning a front cover part of the camera in engagement with the flash unit, and moving the front cover part toward the main body part to pivot the flash unit toward the main body part and to capture the flash unit in place between the front cover part and the main body part.

5 Claims, 6 Drawing Sheets

METHOD OF ASSEMBLING FLASH UNIT TO CAMERA

FIELD OF THE INVENTION

The invention relates generally to the field of photography, and in particular to cameras with a built-in flash unit. More specifically, the invention relates to a method of assembling the flash unit to the camera.

BACKGROUND OF THE INVENTION

Cameras with built-in flash units are well known. Typically, to assemble the flash unit to the camera, the flash unit is secured to a main body part of the camera, and a front cover part is engaged with the main body part to cover the main body part and the flash unit. See prior art U.S. Pat. No. 5,028,943, issued Jul. 1, 1991. Often, as disclosed in the patent, the front cover part has an integral lens cover for a flash tube and reflector of the flash unit.

SUMMARY OF THE INVENTION

A method of assembling a flash unit to a camera, comprising the steps of:

pivotally connecting the flash unit to a main body part of the camera;

positioning a front cover part of the camera in engagement with the flash unit; and moving the front cover part toward the main body part to pivot the flash unit toward the main body part and to capture the flash unit in place between the front cover part and the main body part.

DETAILED DESCRIPTION OF THE INVENTION

The invention is disclosed as being embodied preferably in a camera with a built-in flash unit. Because the features of a camera with a built-in flash unit are generally known, the description which follows is directed in particular only to those elements forming part of or cooperating directly with the disclosed embodiment. It is to be understood, however, that other elements may take various forms known to a person of ordinary skill in the art.

Figure 1:
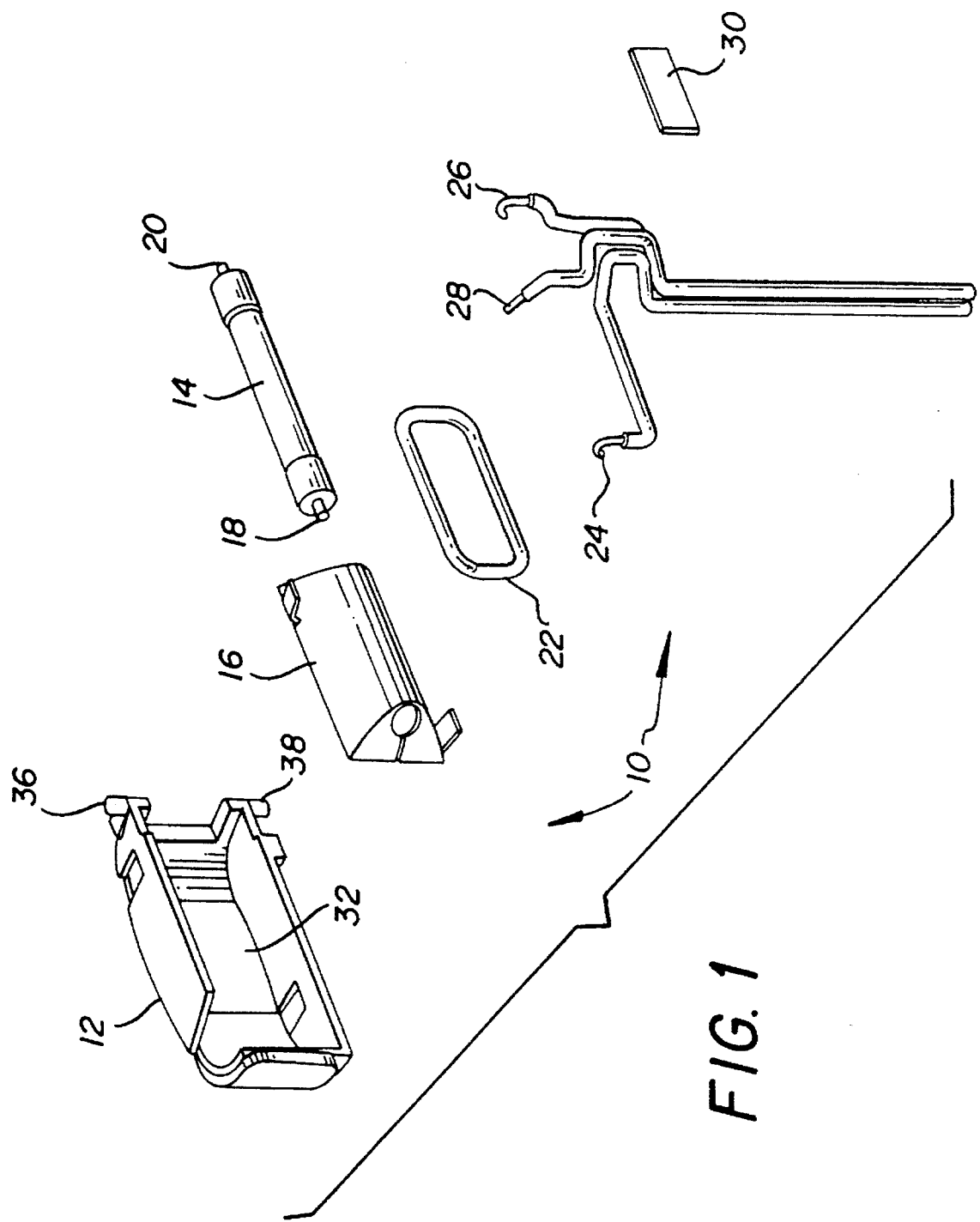
FIG. 1 is an exploded rear perspective view of a flash unit.
Figure 2:
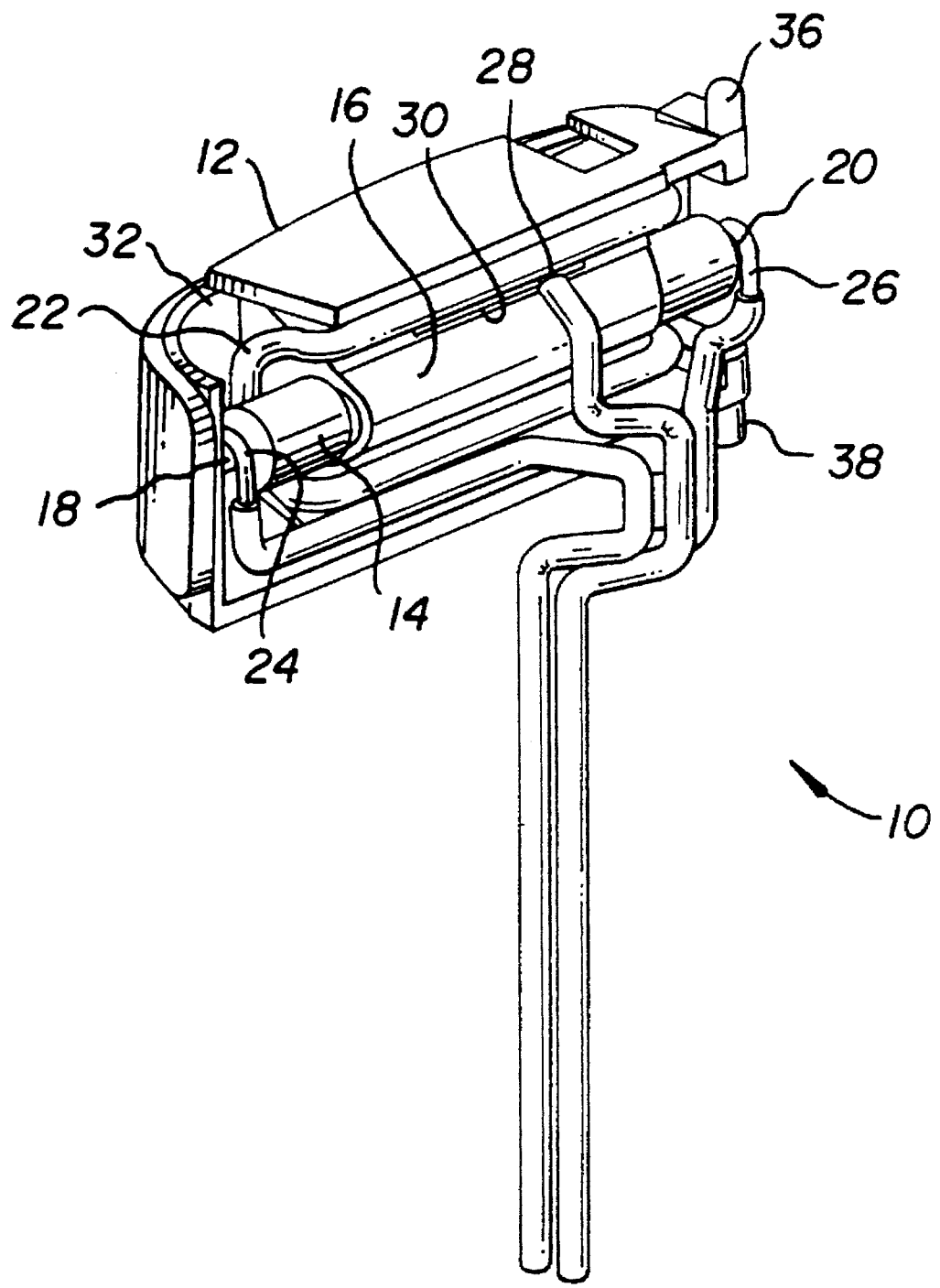
FIG. 2 is an assembled rear perspective view of the flash unit.

Referring now to the drawings, FIGS. 1 and 2 show a flash unit 10 comprising a transparent concave cover lens 12, a glass flash tube 14, and a trough-shaped aluminum flash reflector 16. The flash tube 14 is located within the reflector 16, except for opposite conductive ends 18 and 20 of the flash tube which protrude from the reflector. A closed-loop elastic retainer 22 urges the flash tube 14 toward the rear of the reflector. As is the custom, a pair of wire leads 24 and 26 are soldered to the respective conductive ends 18 and 20 of the flash tube 14, and a third wire lead 28 is soldered to a piece of copper tape 30 which is adhered to the outside of the reflector 16. As shown in FIG. 2, the flash tube 14 and the reflector 16 are located snugly within a rear concavity 32 of the concave cover lens 12.

Figure 3:
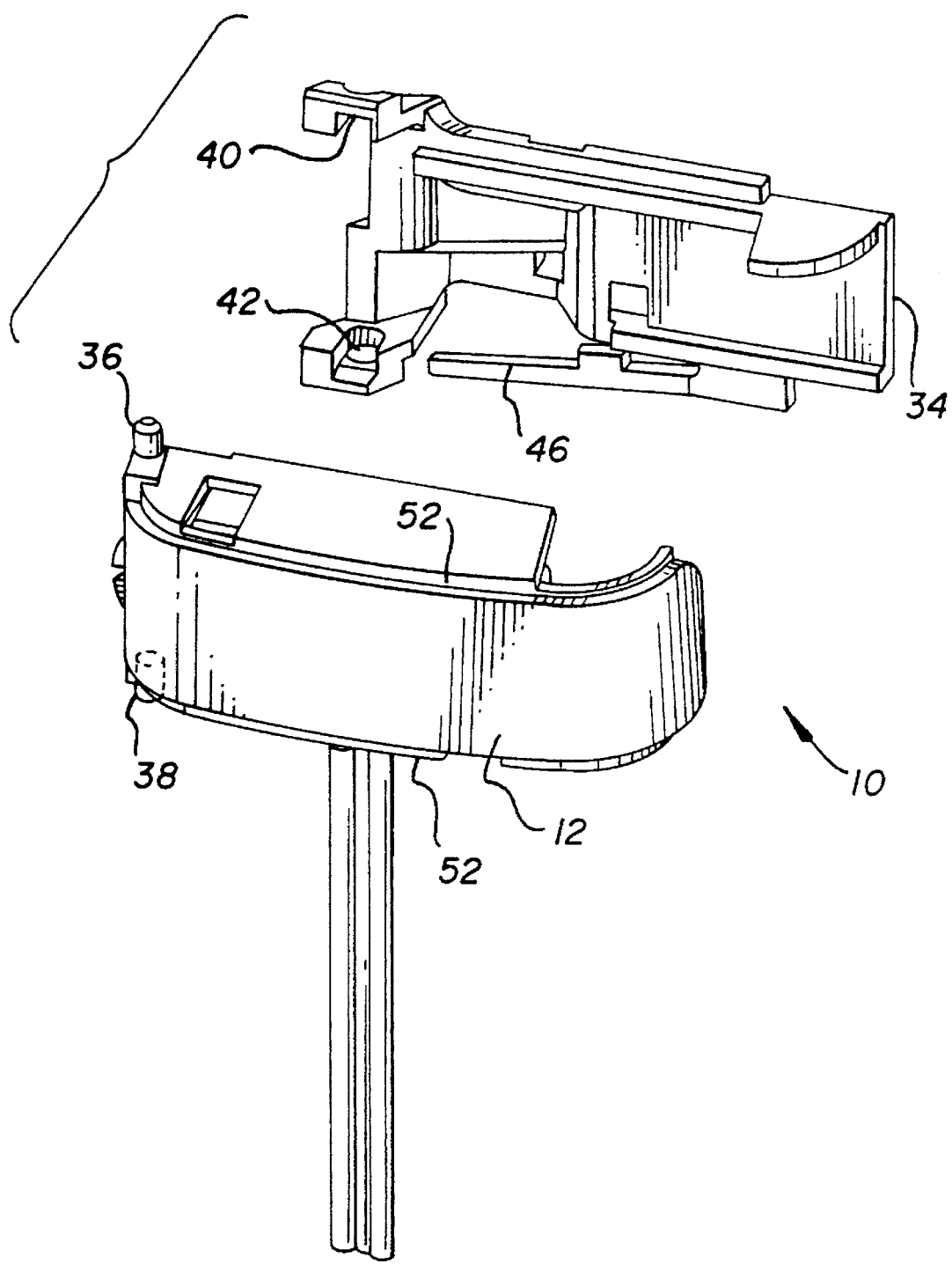
FIG. 3 is a front perspective view of the flash unit and an associated flash mount, showing the flash unit and the flash mount separated.
Figure 4:
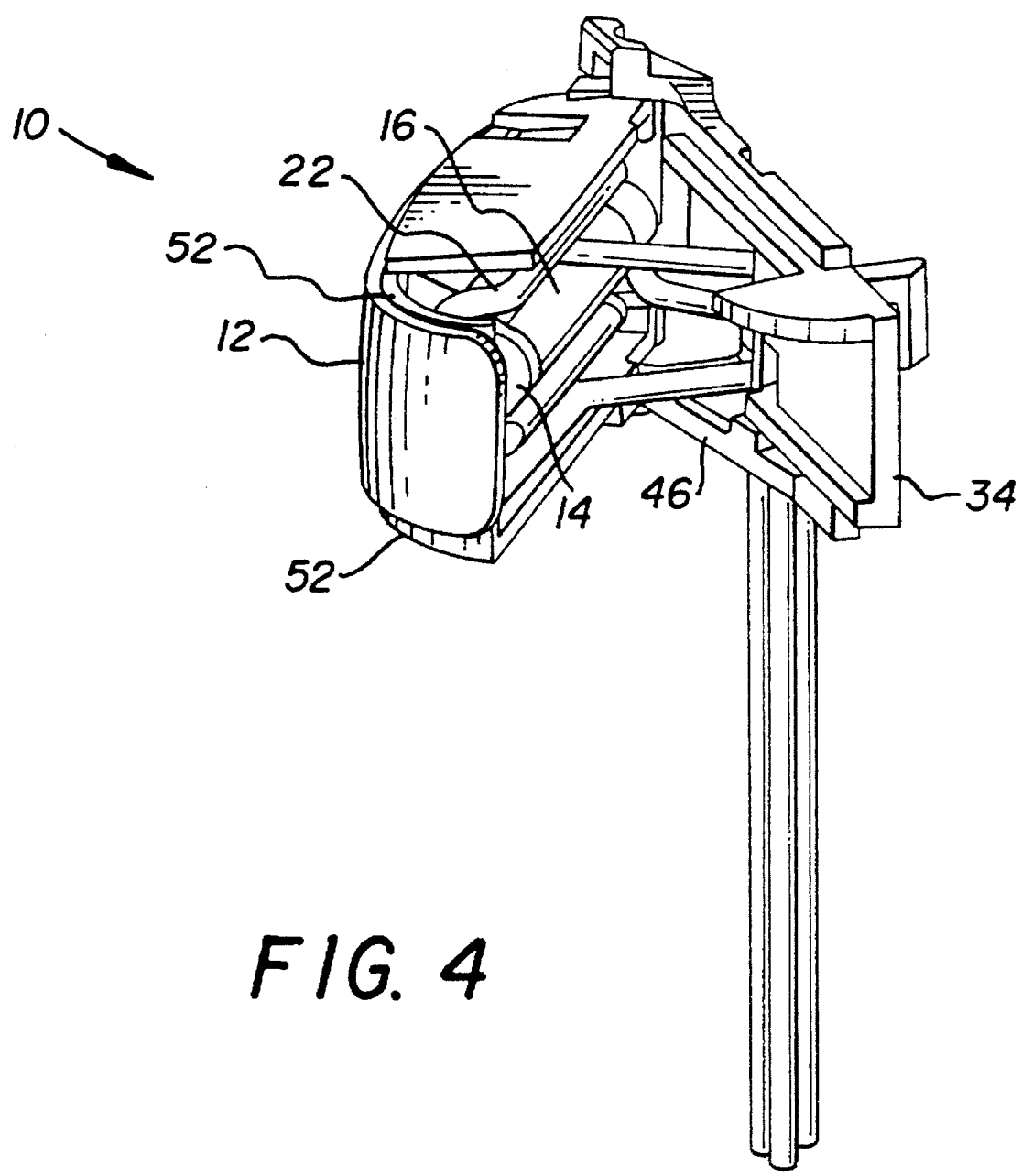
FIG. 4 is a front perspective view of the flash unit and the flash mount, showing the flash unit and the flash mount pivotally connected to each other.
Figure 5:
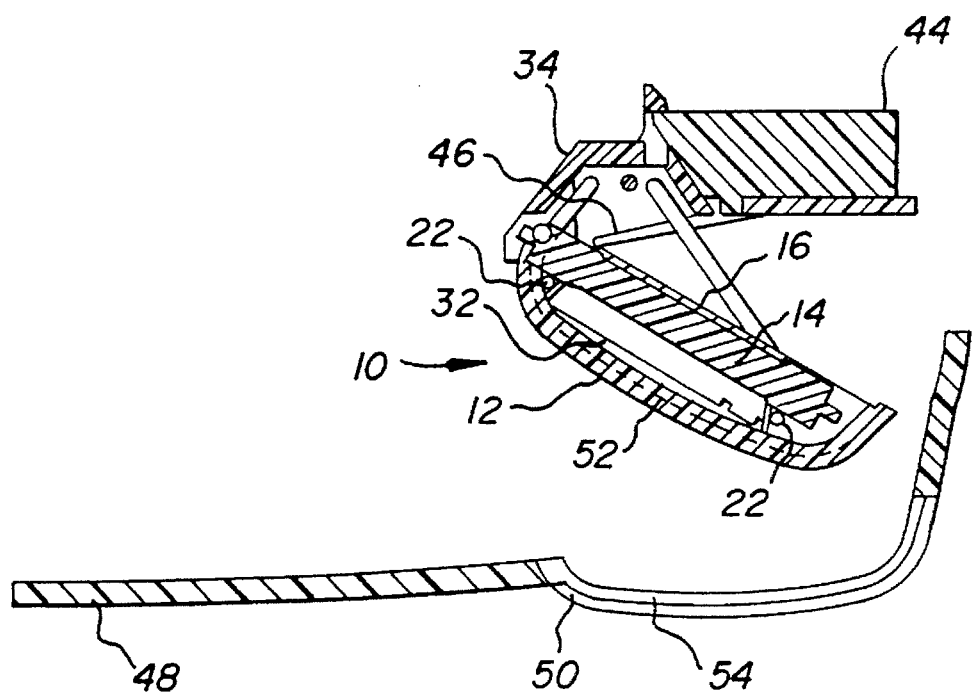
FIGS. 5–7 are sectional views illustrating a method of assembling the flash unit to a camera according to a preferred embodiment of the invention.

To assemble the flash unit 10 to a camera, the concave cover lens 12 (with the flash tube 14 and the reflector 16 located in the rear concavity 32) is pivotally connected to a flash mount 34 as shown in FIG. 4. The concave cover lens 12 has a pair of coaxial pivot pins 36 and 38 which are received in respective pin-holes 40 and 42 in the flash mount 34 to effect the pivotal connection. See FIG. 3. The flash mount 34 is adhered to a main body part 44 (only partly shown) of the camera, and it has an integral spring finger 46 which projects from the flash mount to bear against the concave cover lens 12 to urge the concave cover lens (with the flash tube 14 and the reflector 16 in the rear concavity 32) to pivot away from the flash mount. See FIGS. 4 and 5.

Figure 6:
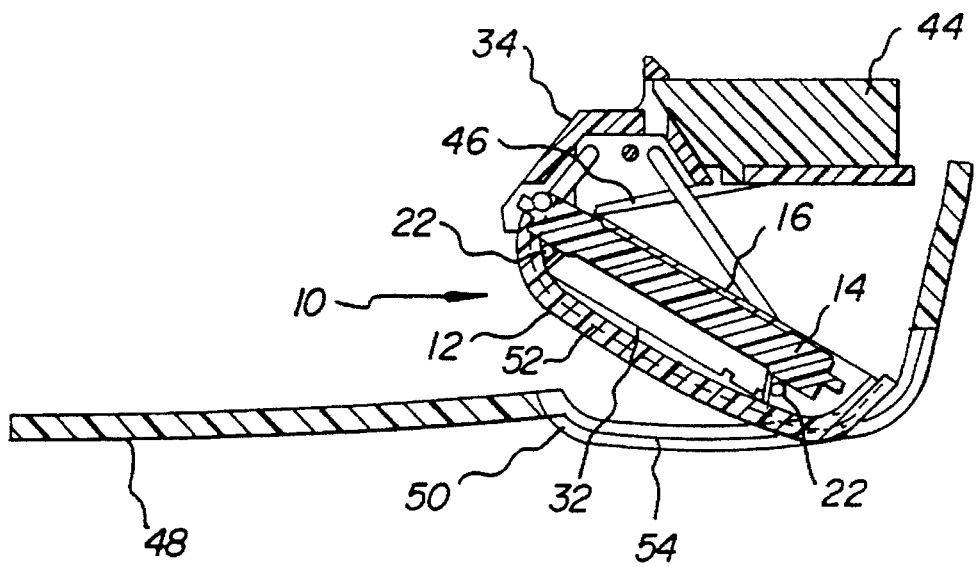

Next, a front cover part 48 of the camera is positioned in sliding engagement with the concave cover lens 12 at an opening 50 in the front cover part as shown in FIG. 6. The front cover lens 12 and the front cover part 48, at its opening 50, have respective steps or edges 52 and 54 which mate to effect the sliding engagement. See FIGS. 5 and 6.

Figure 7:
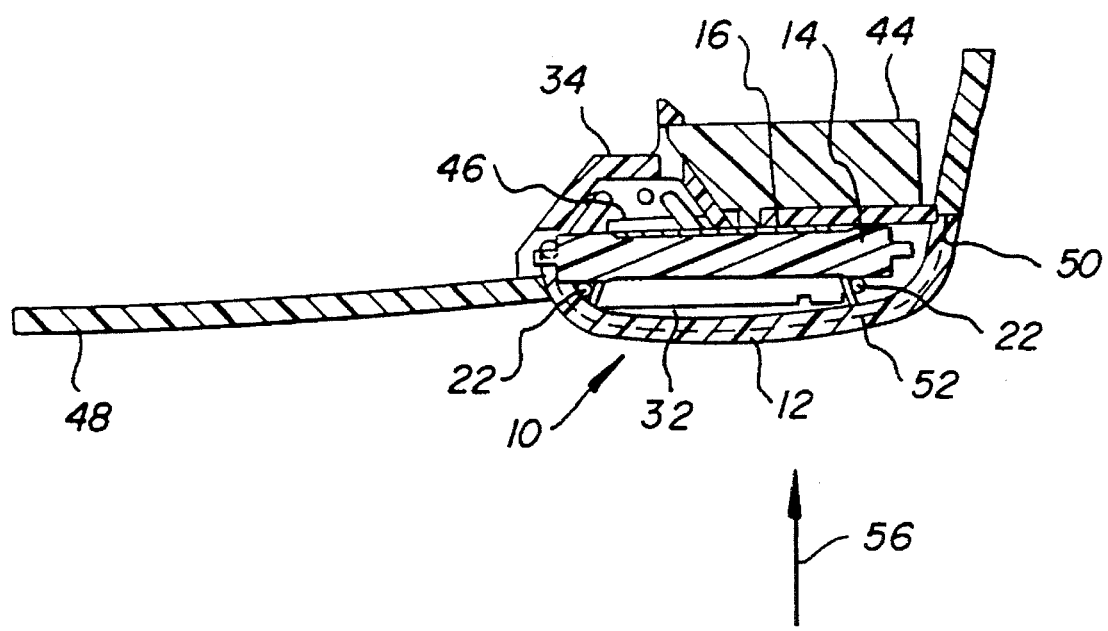

Finally, the front cover part 48 is moved in the direction of the arrow 56 in FIG. 7 toward the flash mount 34 and the main body part 44 to pivot the concave cover lens 12 (with the flash tube 14 and the reflector 16 in the rear concavity 32) toward the flash mount and the main body part, contrary to the urging of the spring finger 46, to seat or nest the concave cover lens in the opening 50 as shown in FIG. 7. Consequently, the concave cover lens 12 (with the flash tube 14 and the reflector 16 in the rear concavity 32) is captured in place between the front cover part 48 and the main body part 44. Then, to complete the assembly, the front cover part 48 is engaged with the main body part 44.

The invention has been described with reference to a preferred embodiment. However, it will be appreciated that variations and modifications can be effected by a person of ordinary skill in the art without departing from the scope of the invention.

PARTS LIST 10. flash unit
12. concave cover lens
14. flash tube
16. flash reflector
18. conductive end
20. conductive end
22. elastic retainer
24. wire lead
26. wire lead
28. wire lead
30. tape
32. concavity
34. flash mount
36. pivot pin
38. pivot pin
40. pin-hole
42. pin-hole
44. main body part
46. spring finger
48. front cover part 50. opening
52. step
54. step
56. arrow

I claim:

1. A method of assembling a flash unit to a camera, comprising the steps of:

pivotally connecting the flash unit to a main body part of the camera;

positioning a front cover part of the camera in engagement with the flash unit; and moving the front cover part toward the main body part to pivot the flash unit toward the main body part and to capture the flash unit in place between the front cover part and the main body part.

2. A method as recited in claim 1, wherein a cover lens of the flash unit is at least partially received within an opening in the front cover part to position the front cover part in engagement with the flash unit.

3. A method as recited in claim 2, wherein the front cover part is moved toward the main body part in opposition to spring means which urges the flash unit into the opening in the front cover part.

4. A method of assembling a flash unit to a camera, comprising the steps of:

pivotally connecting the flash unit, including a flash tube and reflector located at least partially within the concavity of a concave cover lens, to a main body part of the camera;

positioning a front cover part of the camera in engagement with the concave cover lens at an opening in the front cover part; and moving the front cover part toward the main body part to pivot the concave cover lens and the flash tube and reflector toward the main body part and to capture them in place between the opening in the front cover part and the main body part.

5. A flash unit comprising:

a concave cover lens defining a concavity;

a flash tube and reflector located at least partially within said concavity;

a flash mount pivotally connected to said cover lens and having integral spring means which bears against the cover lens to urge the cover lens to pivot away from said flash mount.

* * * * *